(12) United States Patent
Kim et al.

(10) Patent No.: US 7,714,978 B2
(45) Date of Patent: May 11, 2010

(54) METHOD FOR CUTTING LIQUID CRYSTAL DISPLAY PANEL AND METHOD FOR FABRICATING LIQUID CRYSTAL DISPLAY PANEL USING THE SAME

(75) Inventors: Je Hyun Kim, Gyeongsangnam-Do (KR); Hyung Jin Park, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/320,637

(22) Filed: Jan. 30, 2009

(65) Prior Publication Data
US 2009/0142866 A1 Jun. 4, 2009

Related U.S. Application Data

(62) Division of application No. 11/477,789, filed on Jun. 30, 2006, now Pat. No. 7,495,741.

(30) Foreign Application Priority Data
Dec. 29, 2005 (KR) .................. 10-2005-0134396

(51) Int. Cl.
G02F 1/1333 (2006.01)
G02F 1/13 (2006.01)
(52) U.S. Cl. .................... 349/187; 349/158
(58) Field of Classification Search ............... 349/158, 349/187
See application file for complete search history.

(56) References Cited

U.S. PATENT DOCUMENTS

| | | | | |
|---|---|---|---|---|
| 7,320,900 B2 * | 1/2008 | Tanaka et al. | ............ | 438/48 |
| 7,450,213 B2 * | 11/2008 | Kim et al. | ............ | 349/187 |
| 7,583,351 B2 * | 9/2009 | Yoo et al. | ............ | 349/187 |
| 2005/0122463 A1 * | 6/2005 | Byun et al. | ............ | 349/187 |
| 2005/0140921 A1 * | 6/2005 | Lee et al. | ............ | 349/187 |
| 2005/0211047 A1 * | 9/2005 | Eom | ............ | 83/880 |
| 2008/0002137 A1 * | 1/2008 | Kim et al. | ............ | 349/187 |
| 2009/0279045 A1 * | 11/2009 | Kim et al. | ............ | 349/189 |

FOREIGN PATENT DOCUMENTS

KR 10-2006-0078537 7/2006

* cited by examiner

*Primary Examiner*—Michelle R Connelly Cushwa
(74) *Attorney, Agent, or Firm*—McKenna Long & Aldridge LLP

(57) ABSTRACT

A method for cutting a liquid crystal display panel including: forming prearranged cut lines on a pair of attached mother substrates on which a plurality of panel regions have been disposed; and separating the liquid crystal display panel from a dummy glass around the liquid crystal display panel through a transfer unit which includes a body for adsorbing a liquid crystal display panel and transferring it, and a plate attached on an edge of the body, fixing and separating a dummy glass of a mother substrate from the liquid crystal display panel, and moving up and down separately from the body. A dummy removing plate is attached at an edge of a trans hand to remove a dummy glass when a breaking process-finished liquid crystal display panel is extracted, so a damage of the liquid crystal display panel due to the dummy glass can be prevented.

18 Claims, 8 Drawing Sheets

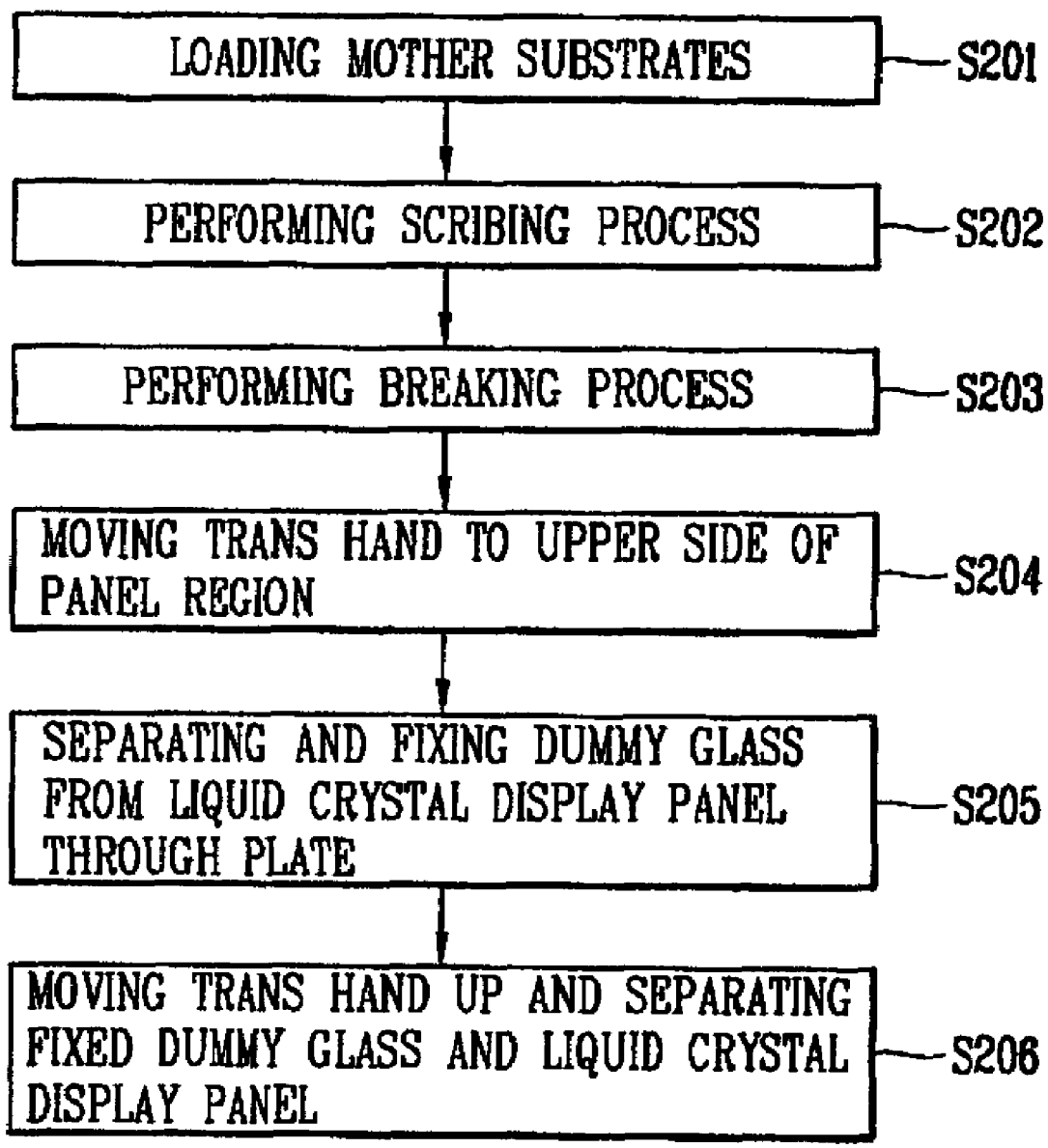

METHOD FOR CUTTING LIQUID CRYSTAL DISPLAY PANEL AND METHOD FOR FABRICATING LIQUID CRYSTAL DISPLAY PANEL USING THE SAME

This application is a Divisional of application Ser. No. 11/477,789, filed Jun. 30, 2006, now U.S. Pat. No. 7,495,741 now allowed; which claims priority to Korean Patent Application No. 10-2005-0134396, filed Dec. 29, 2005 all of which are hereby incorporated by reference as if fully set forth herein.

BACKGROUND OF THE INVENTION

1. Field of the Invention

The present invention relates to a method for cutting a liquid crystal display panel and, more particularly, to a method for cutting a liquid crystal panel to cut a plurality of liquid crystal display panel formed on large-scale mother substrates into a plurality of unit liquid crystal display panels, and a method for fabricating a liquid crystal display panel using the same.

2. Description of the Related Art

As the consumers' interest in information displays grows and the demand for portable (mobile) information devices increases, research and commercialization of light and thin flat panel displays ("FPD") has increased. Flat panel displays may replace the Cathode Ray Tube ("CRT"), which is the most common existing display device.

The liquid crystal display ("LCD") device is a FPD device for displaying images using optical anisotropy of liquid crystal. LCD devices exhibit excellent resolution and color and picture quality, so it is widely applied for notebook computers or desktop monitors, and the like.

The LCD device will now be described in detail.

The general LCD device includes a liquid crystal display panel including a driving circuit unit, a backlight unit installed at a lower portion of the liquid crystal display panel and emitting light to the liquid crystal display panel, a mold frame for supporting the backlight unit and the liquid crystal display panel, and a case, etc.

With reference to FIG. 1, the liquid crystal display panel 10 includes an image display part 13 in which liquid crystal cells are arranged in a matrix form, a gate pad part 14 connected with gate lines 16 of the image display part 13 and a data pad part 15 connected with data lines 17.

The gate pad part 14 and the data pad part 15 are formed at an edge region of a thin film transistor (TFT) array substrate which does not overlap with a color filter substrate 2. The gate pad part 14 supplies scan signals provided from a gate driver (not shown) to the gate lines 16 of the image display part 13, and the data pad part 15 supplies image information provided from a data driver (not shown) to the data lines 17 of the image display part 13.

Although not shown, the color filter substrate 2 includes a color filter including red, green and blue sub-color filters implementing colors, a black matrix for separating the sub-color filters and blocking light from transmitting through a liquid crystal layer, and a transparent common electrode for applying a voltage to the liquid crystal layer.

The array substrate 1 includes a plurality of gate lines 16 and a plurality of data lines 17 arranged vertically and horizontally thereon and defining a plurality of pixel regions, the TFT, namely, a switching element, formed at each crossing of the gate lines 16 and the data lines 17, and a pixel electrode formed on each pixel region.

The array substrate 1 and the color filter substrate 2 are attached in a facing manner by a seal pattern 40 formed at an edge of the image display part 13 to form a liquid crystal display panel 10, and attachment of the two substrates 1 and 2 is made through an attachment key (not shown) formed on the array substrate 1 or the color filter substrate 2.

In order to seek improvement of a yield, in the LCD device, the TFT array substrates are formed on a large-scale mother substrate, color filter substrates are formed on another separate mother substrate, which are then attached to simultaneously form the plurality of liquid crystal display panels. In this case, for the attached mother substrates, a cutting process is required to cut the attached mother substrates into a plurality of unit liquid crystal display panels.

In general, cutting of the mother substrates is performed such that a prearranged cut groove is formed on the mother substrates with a wheel with high hardness compared with glass and then cracking is made along the prearranged cutting groove.

FIG. 2 is a view showing the structure of a section of the unit liquid crystal display panel formed by attaching the first mother substrate on which the TFT array substrates are formed and the second mother substrate on which the color filter substrates are formed.

As shown, in the unit liquid crystal panels, the thin film transistor array substrates 1 are protruded at one side compared to the color filter substrates 2, because the gate pad part (not shown) and the data pad part (not shown) are formed at the edge portion of the thin film transistor array substrate 1 which is not overlapped with the color filter substrate 2.

Accordingly, the color filter substrates 2 formed on the second mother substrate 30 are formed to be separated as long as a first dummy region 31 corresponding to the protruded portion of the thin film transistor array substrates 1 formed on the first mother substrate 20.

The unit liquid crystal panels are suitably disposed such that the first and the second mother substrates 20 and 30 can be utilized to their maximum, and though they differ depending on a model, the unit liquid crystal panels are usually formed to be separated along a second dummy region 32.

After the first mother substrate 20 with the thin film transistor array substrates 1 formed thereon and the second mother substrate 30 with the color filter substrates 2 formed thereon are attached, the liquid crystal panels are cut. At this time, the first dummy region 31 formed at the portion where the color filter substrates 2 of the second mother substrate 30 are separated and the second dummy region 32 separating the unit liquid crystal panels are simultaneously removed.

The cutting process of the liquid crystal display panel will be described as follows.

FIG. 3 is an exemplary view showing a cutting process of the liquid crystal display panel.

As shown, a cutting device of the liquid crystal display panel includes a table 42 on which the first and second mother substrates 20 and 30 for which previous processes have been terminated, are loaded, and a cutting wheel 55 for processing the first and second mother substrates 20 and 30 to form prearranged cut lines 51.

In the cutting device of the liquid crystal display panel, when the first and second mother substrates 20 and 30 including a plurality of liquid crystal display panels and attached in a facing manner are loaded on the table 42, the cutting wheel 55 positioned at an upper side of the first and second mother substrates 20 and 30 is lowered and rotated in a state that certain pressure has been applied to the second mother substrate 30, to thereby form prearranged cut lines 51 in a groove form on the surface of the second mother substrate 30.

The prearranged cut lines are also formed on the first mother substrate 20. Namely, the first mother substrate 20 is processed with the cutting wheel 55 to form prearranged cut lines at the same positions as the prearranged cut lines 51 of the second mother substrate 30. Accordingly, in the liquid crystal panel cutting process, since the first and second mother substrates 20 and 30 are processed to form the prearranged cut lines 51, after the second mother substrate 30 is processed with the cutting wheel 55, the liquid crystal panel is reversed to make the first mother substrate 20 to face upward and then the first mother substrate 20 is processed with the cutting wheel 55.

Thereafter, pressure is applied to the prearranged cut lines 51 formed on the first and second mother substrates 20 and 30 to separate the first and second mother substrates 20 and 30. And then, the first and second mother substrates 20 and 30 are separated such that the first and second mother substrates 20 and 30 are broken with a breaking bar so that cracking can be made along the prearranged cut lines 51.

In cutting the liquid crystal display panel, a scribing process and a breaking process are performed several times through a plurality of passes.

Thus, much time is required for the scribing process and the breaking process causing the problem of a reduction in productivity.

In particular, according to the cutting method of the liquid crystal display panel, since the mother substrates are struck with the breaking bar to make cracks along the prearranged cut lines formed on the mother substrates, a plurality of glass chips are generated, and if the striking is not performed inaccurately or if cracking is not incompletely made, the liquid crystal display panel would be damaged or torn off when it is extracted.

BRIEF DESCRIPTION OF THE INVENTION

Therefore, one aspect of the present invention involves the recognition by the present inventors of the drawbacks in the related art as explained above. In order to address such problems, the present invention provides a method for cutting a liquid crystal display panel capable of shortening time required for cutting a liquid crystal display panel, and a method for fabricating a liquid crystal display panel using the same.

Another aspect of the present invention provides a method for cutting a liquid crystal display panel capable of preventing dropping of a dummy glass when unit liquid crystal display panels are extracted from a large-scale mother substrate on which prearranged cut lines have been formed, and a method for fabricating a liquid crystal display panel using the same.

One feature of the present invention is to provide an apparatus for transferring a liquid crystal display panel including: a body for adsorbing a liquid crystal display panel and transferring it; and a plate attached on an edge of the body, fixing and separating a dummy glass of a mother substrate from the liquid crystal display panel, and moving up and down separately from the body.

Another feature of the present invention is to provide a method for cutting a liquid crystal display panel including: forming prearranged cut lines on a pair of attached mother substrates on which a plurality of panel regions have been disposed; and separating the liquid crystal display panel from a dummy glass around the liquid crystal display panel through a transfer unit which includes a body for adsorbing a liquid crystal display panel and transferring it, and a plate attached on an edge of the body, fixing and separating a dummy glass of a mother substrate from the liquid crystal display panel, and moving up and down separately from the body.

Still another feature of the present invention is to provide a method for fabricating a liquid crystal display panel including: providing mother substrates divided into a plurality of panel regions; performing an array process on the mother substrate for an array substrate and performing a color filter process on the mother substrate for a color filter substrate; forming an alignment film on the surface of the mother substrates; performing rubbing on the alignment film-formed mother substrates; attaching the pair of rubbing-finished mother substrates; attaching the pair of rubbing-finished mother substrates; forming prearranged cut lines on the pair of attached mother substrates; and separating the liquid crystal display panel from a dummy glass around the liquid crystal display panel through a transfer unit which includes a body for adsorbing a liquid crystal display panel and transferring it, and a plate attached on an edge of the body, fixing and separating a dummy glass of a mother substrate from the liquid crystal display panel, and moving up and down separately from the body.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 9 is a flow chart illustrating the sequential processes of a method for cutting a liquid crystal display panel in accordance with the present invention in FIGS. 7 and 8.

DETAILED DESCRIPTION OF THE INVENTION

A method for cutting a liquid crystal display panel and a method for fabricating a liquid crystal display panel using the same according to the present invention will be described with reference to the accompanying drawings.

Figure 1:
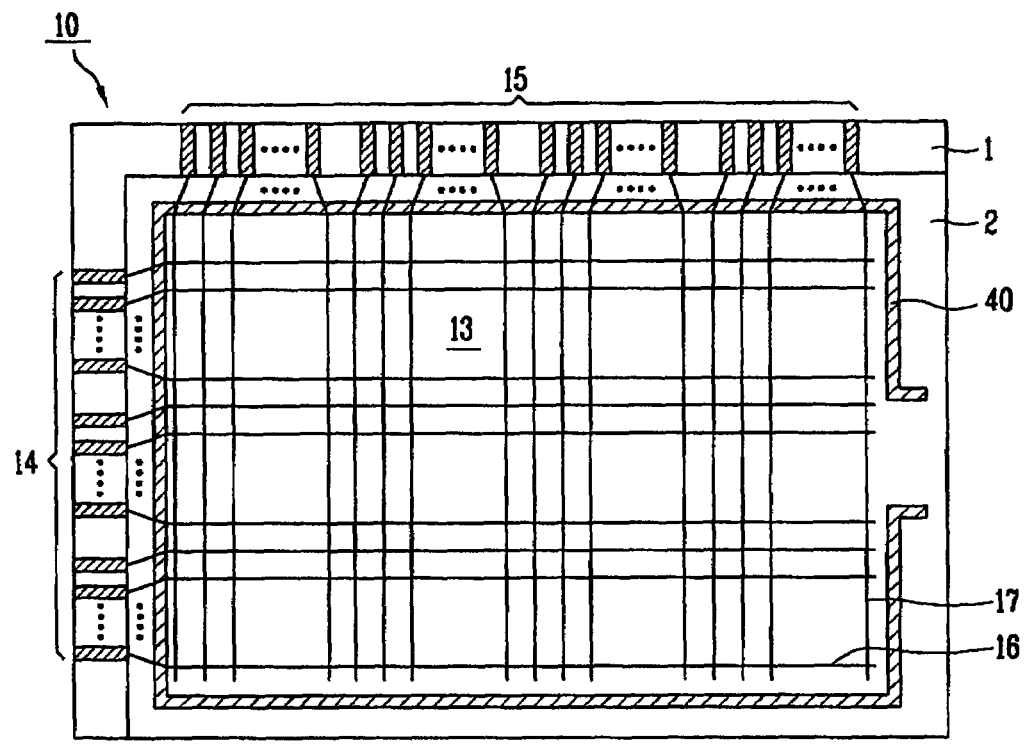
FIG. 1 is an exemplary view showing a plane structure of a unit liquid crystal display panel formed by attaching a thin film transistor (TFT) array substrate and a color filter substrate in a facing manner.
Figure 2:
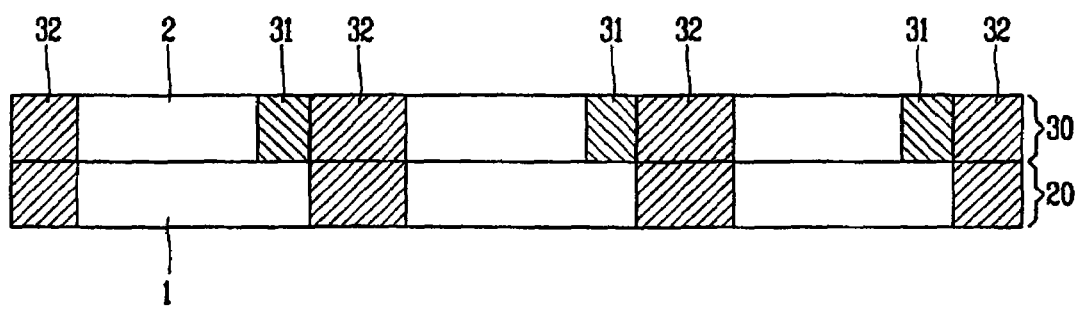
FIG. 2 is a view showing the structure of a section of the unit liquid crystal display panel formed by attaching the first mother substrate on which the TFT array substrates are formed and the second mother substrate on which the color filter substrates are formed.
Figure 3:
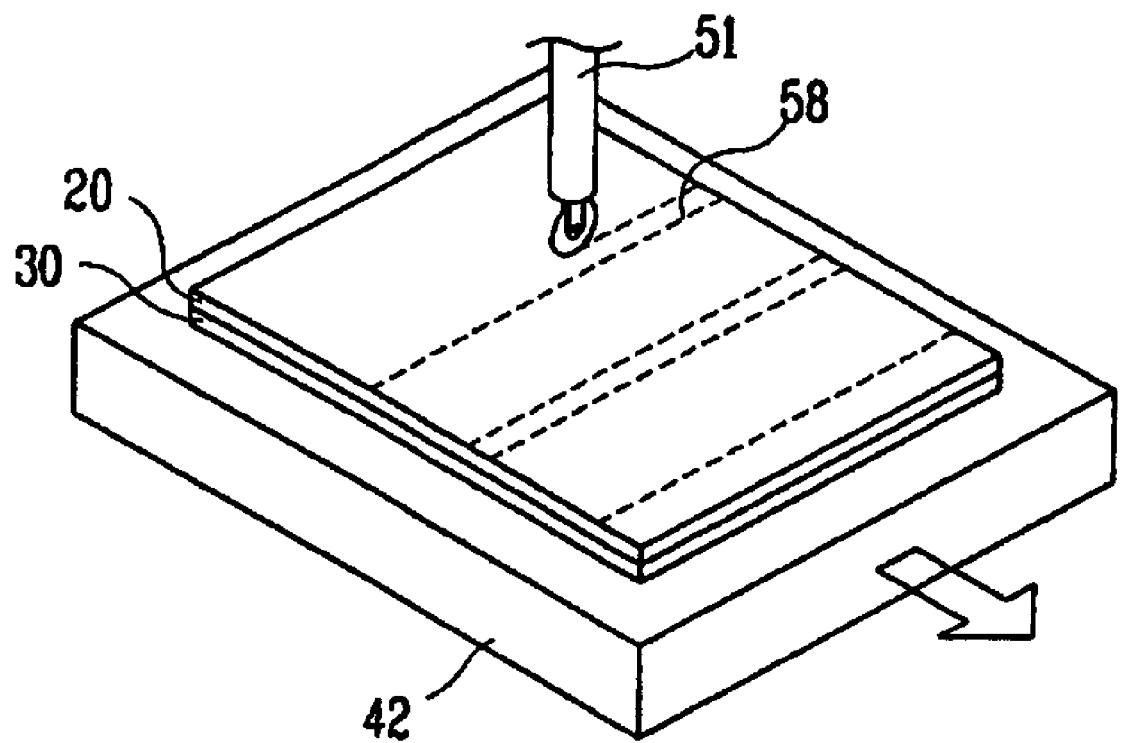
FIG. 3 is an exemplary view showing a cutting process of a liquid crystal display panel.
Figure 4:
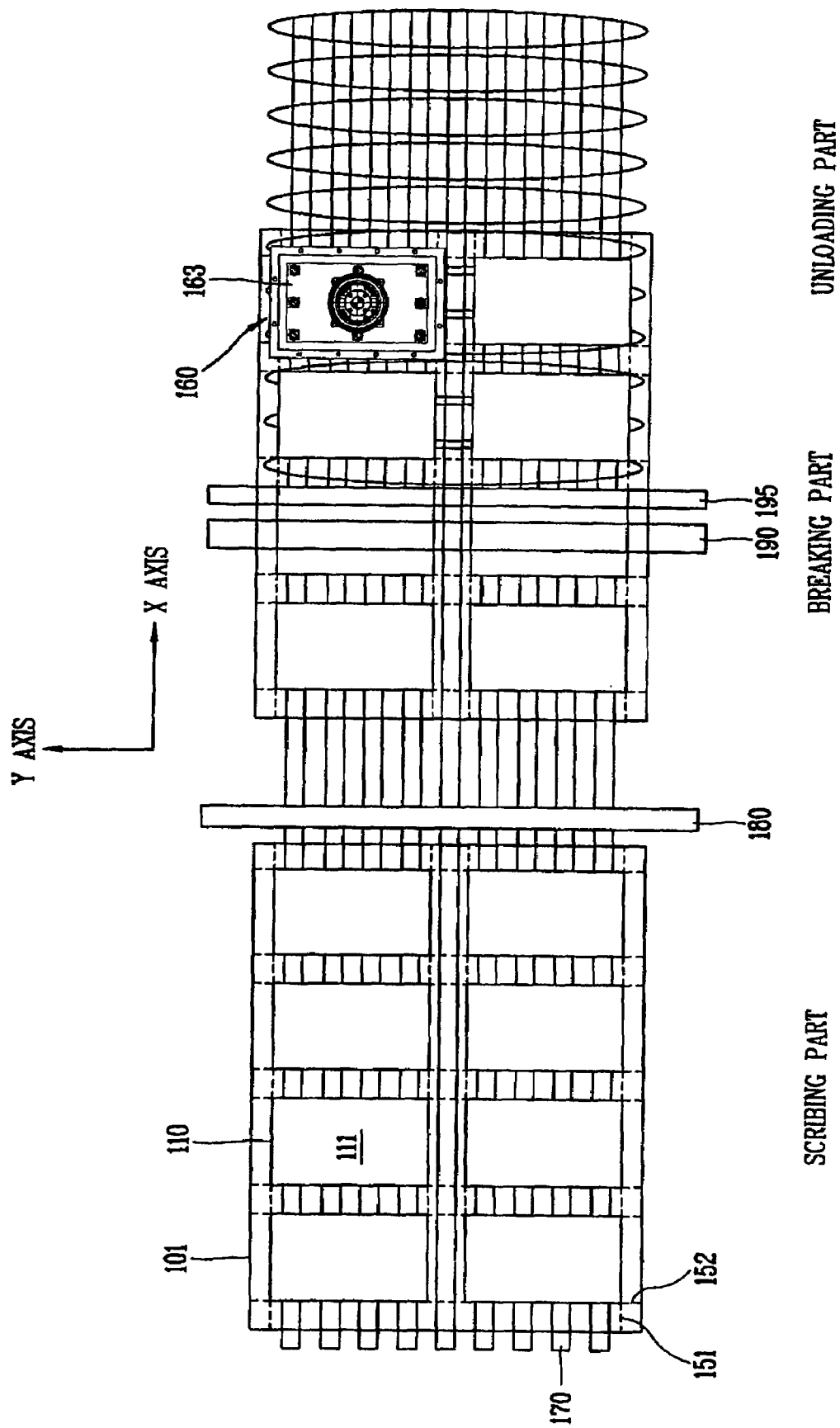
FIG. 4 is an exemplary view showing a cutting process of a liquid crystal display panel in accordance with the present invention.

FIG. 4 is an exemplary view showing a cutting process of a liquid crystal display panel in accordance with a first embodiment of the present invention.

As shown in FIG. 4, a pair of attached mother substrates 101 on which a plurality of panel regions 111 have been arranged are transferred to a scribing part through a conveying unit so as to be divided into individual unit liquid crystal display panels along the panel regions 111.

The panel regions 111 can be an array substrate on which thin film transistors (TFTs) have been formed through an array process, and the lower panel region 111 can be a color filter substrate on which color filters have been formed through a color filter process. In this embodiment of the present invention, the panel regions have the same size, but the present invention is not limited thereto and the panel regions 111 can be formed with at least two different sizes. In this case, the upper array substrate and the lower color filter substrate are attached to form a unit liquid crystal display panel 110.

In the drawing, the conveying unit includes a plurality of conveyer belts 170, but the present invention is not limited thereto and the conveying unit may include a plurality of transfer rollers. In addition, the conveying unit may include a first convey part formed as a conveyer belt and a second convey part formed as a transfer roller, which are coupled.

After the mother substrates 101 are transferred to the scribing part, first prearranged cut lines 151 are formed to section the panel regions 111 on the front and rear surfaces of the mother substrates 101 in a first direction with a scribing unit 180.

The scribing unit 180 driven in an X axis direction includes a pair of heads (not shown) and repeatedly performs a first scribing process by four times to form the first prearranged cut lines 151 in the first direction, namely, in the X axis direction on the mother substrates 101 through the heads.

After the first scribing process in the first direction is finished, in a state that the scribing unit 180 is maintained at a certain position with respect to an X axis, the heads of the scribing unit 180 are driven in a Y axis direction to form second prearranged cut lines 152 for sectioning the panel regions 111 on the front and rear surfaces of the mother substrates 101 in a second direction. In this case, in order to form the second prearranged cut lines 152 on the mother substrates 101 through the heads, eight times of scribing process are repeated in the second direction, namely, in the Y axis direction.

In this case, in this embodiment of the present invention, the first scribing process is performed four times in the X axis direction and the second scribing process is performed eight times in the Y axis direction to form the total eight sheets of liquid crystal display panels 110 on the large-scale mother substrates 101, but the present invention is not limited thereto and can be applicable regardless of the number of times of performing the scribing process in the X and Y axes directions.

The scribing unit 180 includes a head at the upper and lower portions thereof to form the first and second prearranged cut lines 151 and 152 on the front and rear surfaces of the mother substrates 101. A scribing wheel (not shown) made of a material having a higher hardness than glass is mounted at each head.

After the scribing process in the first and second directions is finished, the mother substrate 101 is moved to the breaking part. In the breaking part, steam is sprayed onto the front and rear surfaces of the mother substrates 101 through a steam break 190 disposed to be substantially perpendicular to the proceeding direction of the mother substrates 101 to make cracks along the prearranged cut lines 151 and 152 to thereby separate liquid crystal display panels 110.

Although not shown, the steam break 190 includes a body for receiving water through a water supply pipe, a heating unit provided inside the body and heating water supplied through the water supply pipe to generate steam and a spraying unit for spraying steam generated by the heating unit onto the surface of the mother substrates 101.

Steam generated from the spraying unit is sprayed onto the front and rear surfaces of the mother substrates 101 at a temperature of about 100° C.-250° C. to expand the mother substrates 101 made of the glass material according to heat and pressure. In this case, the first and second prearranged cut lines 151 and 152 of the mother substrates 101 are expanded to be cut therealong, while the mother substrates 101 are being transferred to an unloading part.

In this case, an air knife 195 for spraying dried air with a certain pressure is installed at a rear surface of the steam break 190 in order to remove moisture or glass chips remaining on the surface of the mother substrates 101 after the steam is sprayed on the mother substrates 101, and at the same time, proceed with making cracks formed along the first and second prearranged cut lines 151 and 152.

As stated above, according to the method for cutting the liquid crystal display panel in the first embodiment of the present invention, the first prearranged cut lines are simultaneously formed on the front and rear surfaces of the mother substrates and then the scribing heads are driven in the Y axis direction to simultaneously form the second prearranged cut lines on the front and rear surfaces of the mother substrates. Thus, without having to rotate or reverse the mother substrates, the first and second prearranged cut lines can be formed on the front and rear surfaces of the mother substrates.

In addition, as for the mother substrates 101 on which the first and second prearranged cut lines 151 and 152 have been formed, a crack is formed along the first and second prearranged cut lines 151 and 152 using the steam break 190 and the air knife 195 to separate the unit liquid crystal display panels 110. Thus, compared with the breaking process performed by striking using the break bar, a required time can be shortened and the liquid crystal display panels 110 can be separated without causing damage thereto.

The unit liquid crystal display panels 110 separated from the mother substrates 101 through the scribing process and the breaking process are extracted through a transfer unit such as a trans hand 160 and transferred to a reversing unit.

In this case, the trans hand 160 also serves to completely separate a dummy glass, if any, that has not been separated from the liquid crystal display panels 110 yet through the breaking process.

Namely, a plate 163 with a certain form is attached at an edge of the trans hand 160 to remove a dummy glass which has not been separated from the edge of the liquid crystal display panels 110 before the liquid crystal display panels 110 are extracted, and then, extracts the respective liquid crystal display panels 110 in an upper direction to separate them from the mother substrates. By doing that, the problem of the related art in which, after the breaking process is performed, the liquid crystal display panels are adsorbed and moved upwardly using the trans hand and then the dummy glass which has been moved upward together with the liquid crystal display panels are removed using a pusher attached at the edge of the trans hand, and in this case, the dummy glass separated by the pusher may be dropped onto the mother substrates which have not been separated yet to damage other liquid crystal display panels or the dropped dummy glass can be caught by the conveyer belt to interfere proceeding of the mother substrates.

Figure 5:
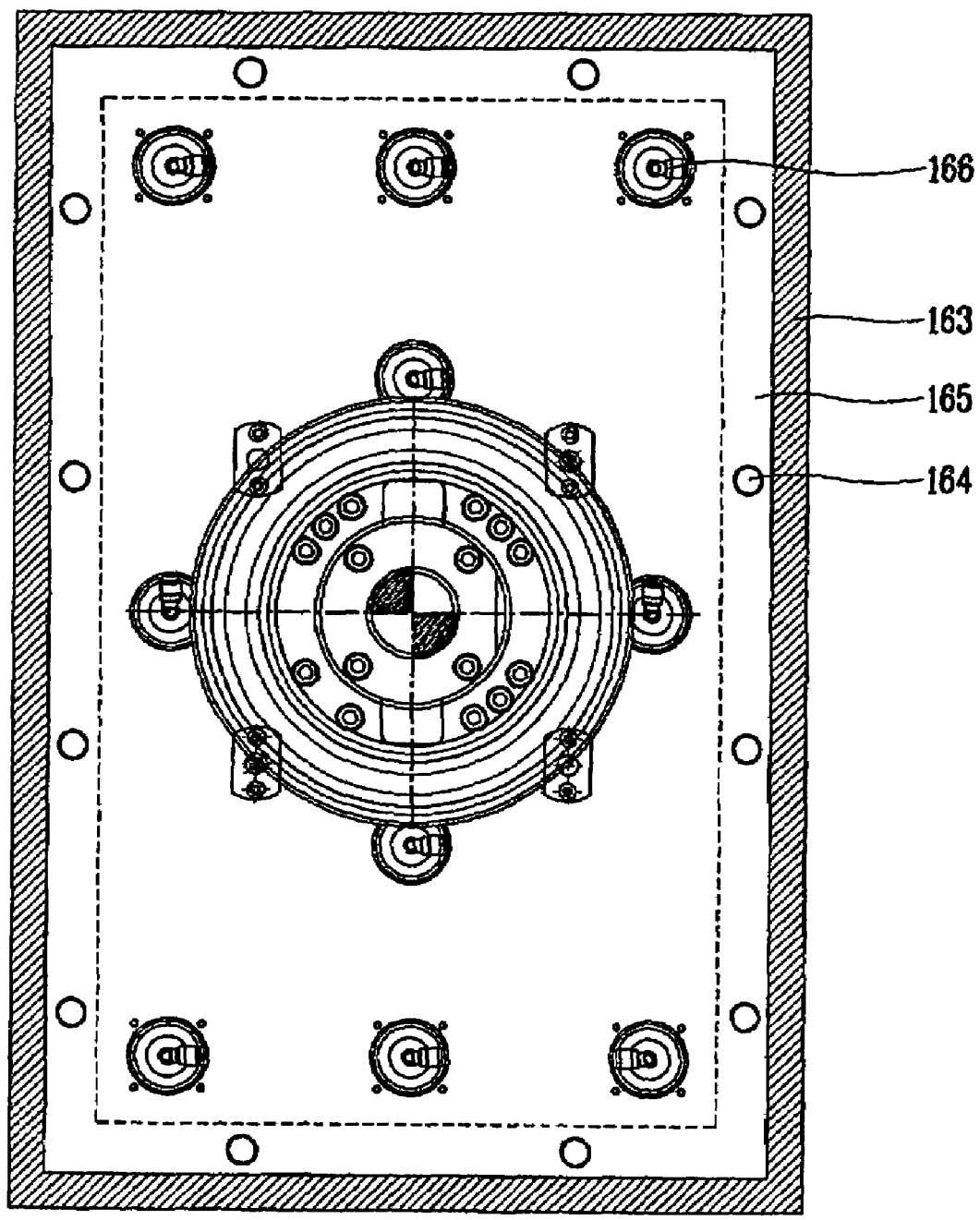
FIG. 5 is an exemplary view showing a plane structure of a trans hand for taking out a liquid crystal display panel in accordance with the present invention.

FIG. 5 is an exemplary view showing a plane structure of a trans hand for taking out a liquid crystal display panel in accordance with the present invention.

As shown in FIG. 5, in the trans hand 160, a plurality of adsorption members 166 are formed on a body 165, through which the liquid crystal display panels are adsorbed to be separate from the mother substrates to be extracted.

The plate 163 with a certain form is formed at an edge of the body 165 of the trans hand 160 in order to remove a dummy glass. In FIG. 5, a rectangular plate 163 is shown as an example, but the present invention is not limited thereto and can be applicable regardless of the form of the plate 163.

The plate 163 includes a plurality of cylinders 164 for allowing the plate 163 to be driven separately from the body 165 of the trans hand 160, in order to remove the dummy glass which has not been separated yet from the liquid crystal display panels before the liquid crystal display panels are extracted.

Namely, the plate 163 of the trans hand 160 is driven up and down separated from the body 165 of the trans hand 160 through the cylinders 164 installed at the plate 163 in order to separate and remove the dummy glass around the liquid crystal display panels adsorbed and fixed by the adsorption members 166 from the liquid crystal display panels.

Figure 6A:
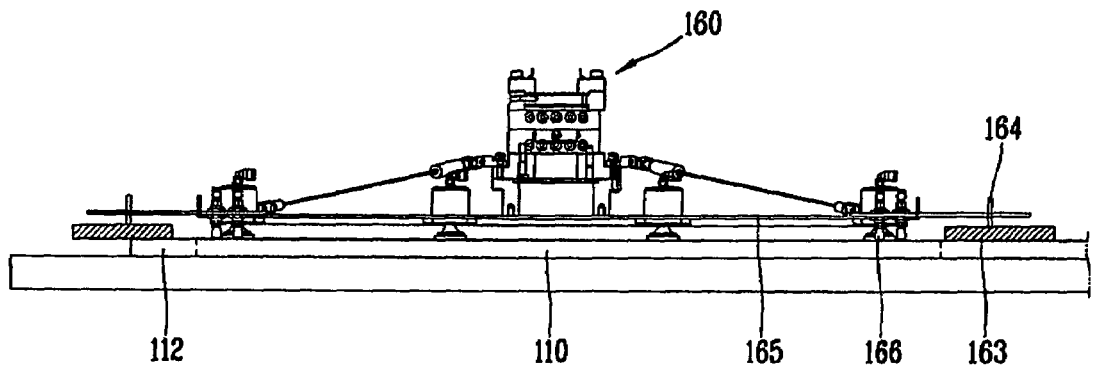
FIGS. 6A to 6C are exemplary view showing a process of sequentially taking a liquid crystal display panel from a mother substrate and carrying it using the trans hand.
Figure 6B:
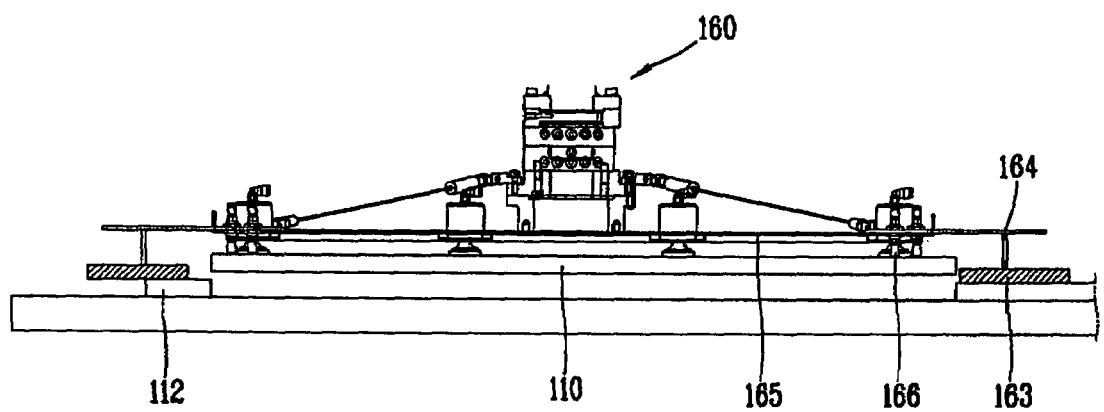
Figure 6C:
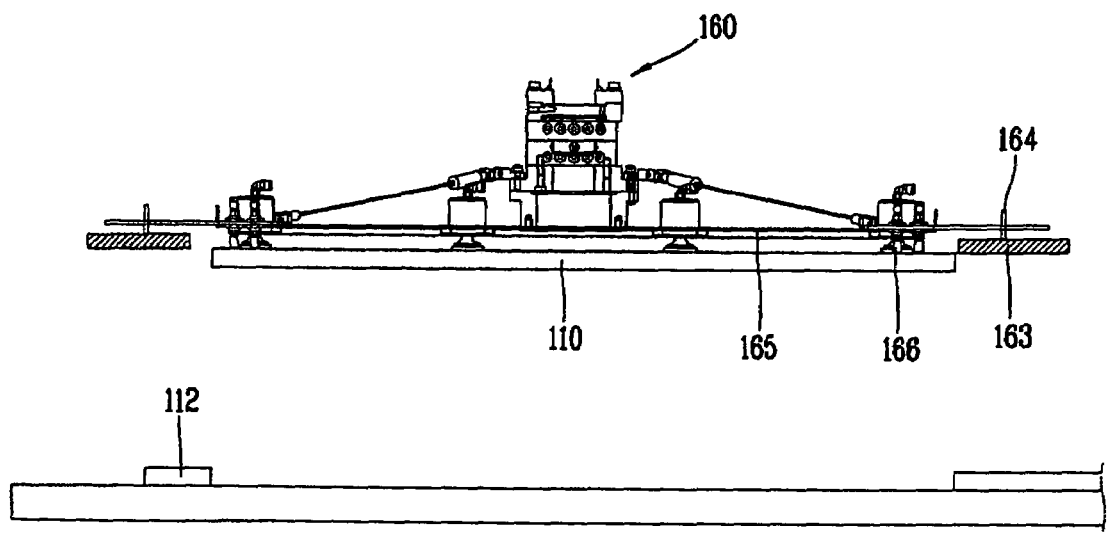

FIGS. 6A to 6C are exemplary view showing a process of sequentially taking a liquid crystal display panel from a mother substrate and carrying it using the trans hand.

First, as shown in FIG. 6A, after the scribing process and the breaking process are finished, the mother substrates are transferred to a certain unloading part, and then, the trans hand 160 is moved to an upper portion of the mother substrates so as to be positioned on an upper side of a certain liquid crystal display panel 110.

Thereafter, the trans hand 160 is moved downward so as to be adsorbed and fixed on the surface of the liquid crystal display panel 110 to be extracted through the adsorption members 166 of the trans hand 160.

In this case, because the rectangular plate 163 is attached at the edge portion of the trans hand 160, it separates and fixes a dummy glass 112 around the liquid crystal display panel 110. As mentioned above, the plate 163 is driven up and down separately from the body 165 of the trans hand 160 through the cylinders 164 installed at the plate 163, and in this case, the cylinders 164 are driven down so that the plate 163 can press and fix the dummy glass 122 around the liquid crystal display panel 110 downward.

And then, as shown in FIG. 6B, in a state that the plate 163 and the dummy glass 112 pressed and fixed by the plate 163 are maintained at their positions, the body 165 of the trans hand 160 is moved up. Then, the liquid crystal display panel 110 adsorbed to the adsorption members 166 of the trans hand 160 is completely separated from the dummy glass 112 fixed by the plate 163 and moved up.

In this case, the cylinders 164 connected with the plate 163 is maintained to be driven downward until the dummy glass 112 can be completely separated from the liquid crystal display panel 110.

After the liquid crystal display panel 110 and the dummy glass 112 are completely separated, as shown in FIG. 6C, the cylinders 164 are driven upward, so that the separated dummy glass 112 is left in the uploading part and the liquid crystal display panel 110 adsorbed onto the adsorption members 166 are transferred to the reversing unit.

In this manner, by attaching the rectangular plate 163, instead of a pusher, at the edge of the trans hand 160, the dummy glass 112 can be separated from the liquid crystal display panel 110 in a state that the dummy glass 112 is maintained at is position in the unloading part. Accordingly, when the liquid crystal display panel 110 is extracted, a damage of the liquid crystal display panel 110 by the dummy glass 112 can be prevented.

Figure 7:
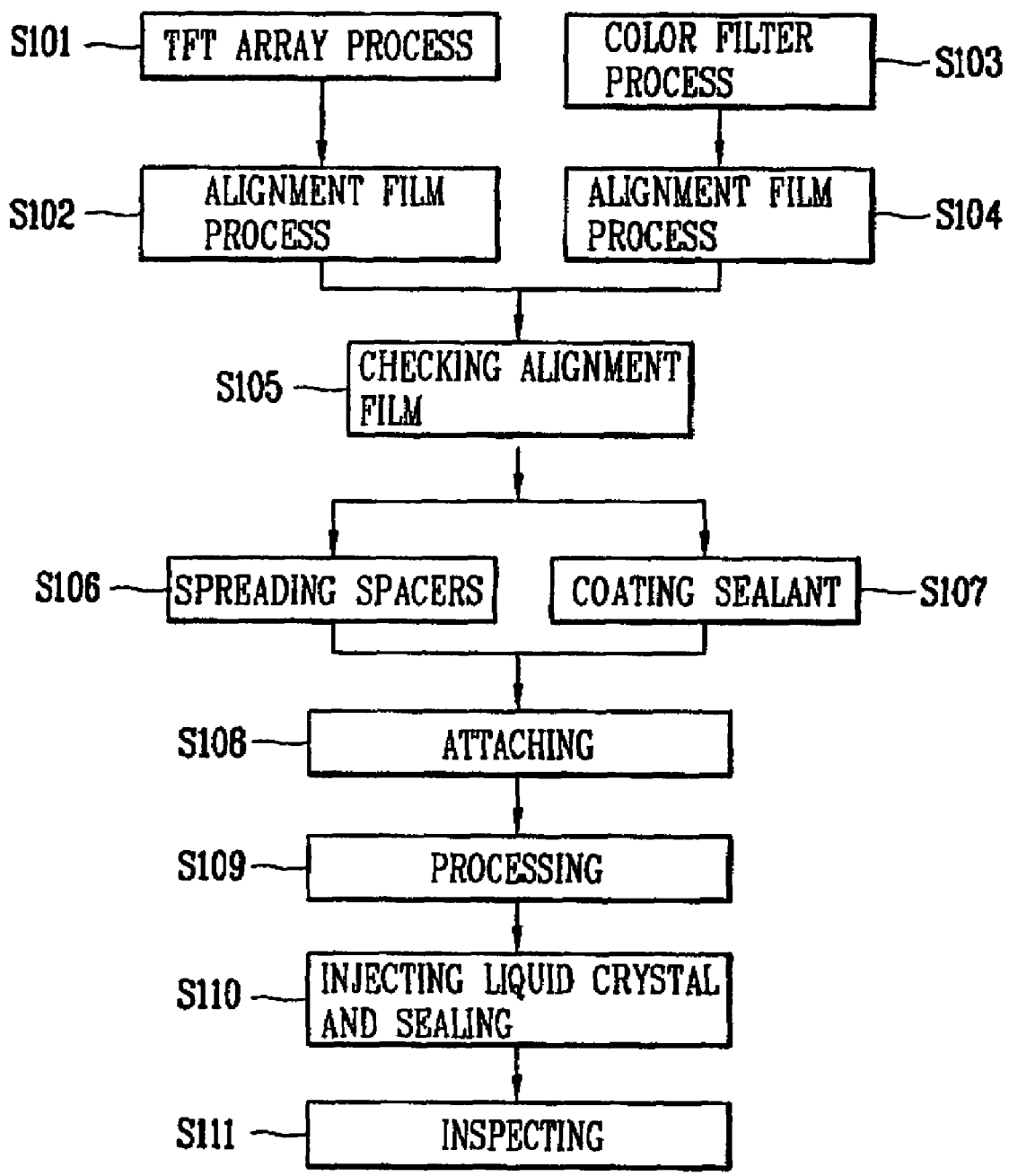
FIG. 7 is a flow chart illustrating the sequential processes of one method for fabricating a liquid crystal display panel in accordance with the present invention.
Figure 8:
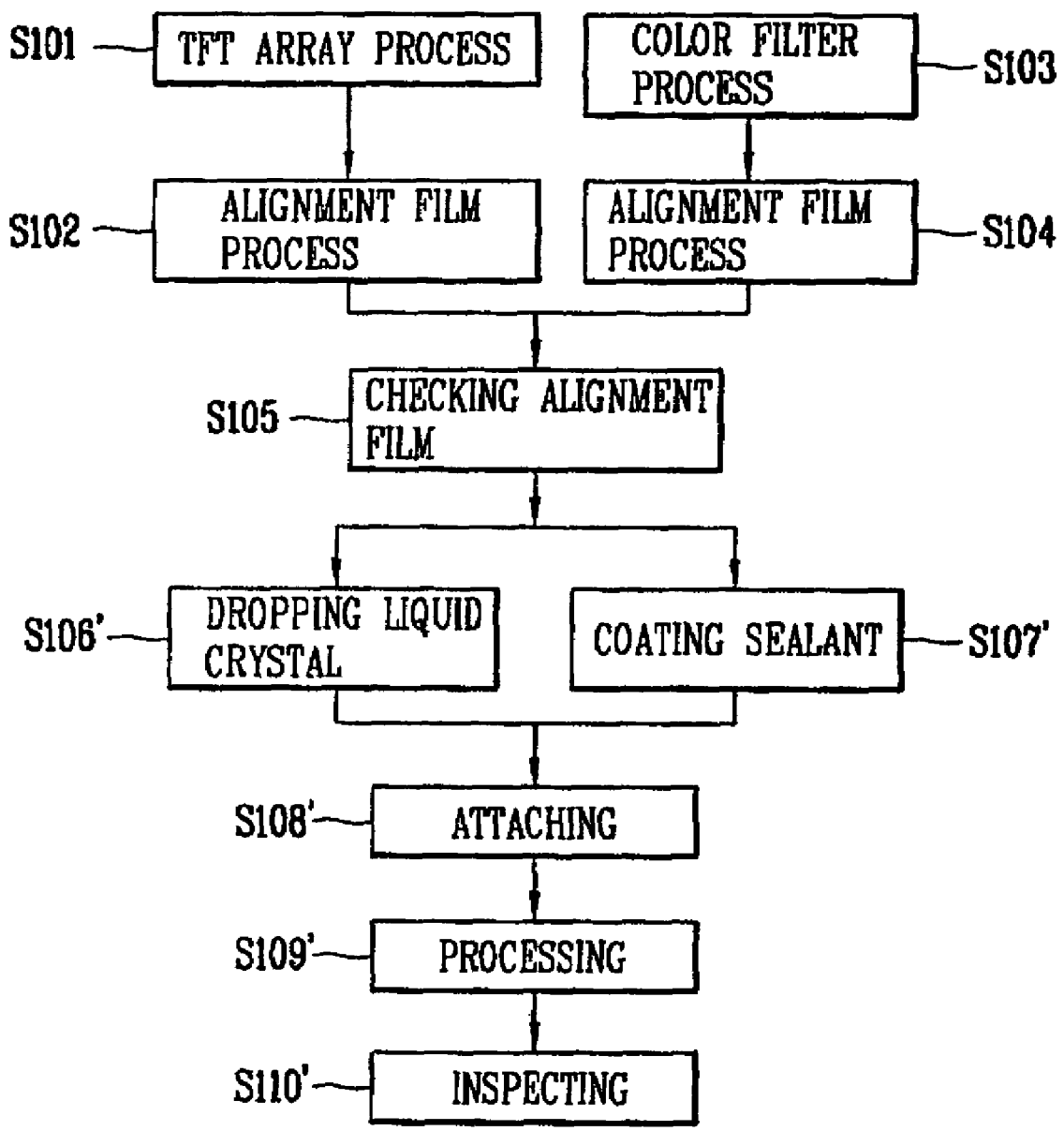
FIG. 8 is a flow chart illustrating the sequential processes of another method for fabricating a liquid crystal display panel in accordance with the present invention.

FIG. 7 is a flow chart illustrating the processes of one method for fabricating a liquid crystal display panel in accordance with the present invention, and FIG. 8 is a flow chart illustrating the processes of another method for fabricating a liquid crystal display panel in accordance with the present invention.

Specifically, FIG. 7 shows a method for fabricating an LCD in which a liquid crystal layer is formed by a liquid crystal injection method, and FIG. 8 shows a method for fabricating an LCD in which a liquid crystal layer is formed by a liquid crystal dropping method.

The process for fabricating the liquid crystal display panel can be divided into a driving device array process for forming a driving device on the lower array substrates, a color filter process for forming a color filter on the upper color filter substrate, and a cell process for attaching the array substrate and the color filter substrate.

To begin with, a plurality of gate lines and a plurality of data lines arranged to define pixel regions on the lower substrate are formed and a TFT switching device is formed to be connected with the gate lines and the data lines at each of the pixel regions through the array process (step S101). In addition, a pixel electrode which is connected with the TFT and drives the liquid crystal layer as a signal is applied thereto through the TFT is formed through the array process.

A color filter layer comprising red, green and blue sub-color filters implementing color and a common electrode are formed on the upper substrate through the color filter process (step S103).

In this respect, when fabricating an in-plane switching (IPS) mode LCD device, the common electrodes are formed on the lower substrate on which the pixel electrodes have been formed through the array process.

Subsequently, after an alignment film is printed on the upper and lower substrates, it is aligned to provide an anchoring force or a surface fixing force (namely, a pretilt angle and an alignment direction) to liquid crystal molecules of a liquid crystal layer formed between the upper and lower substrates (step S102 and S104).

After the rubbing process is finished, the upper and lower substrates are inspected as to whether its alignment films are defective or not through an alignment film inspecting device (step S105).

The liquid crystal display panel uses electro-optic effects of liquid crystal, and since the electric optical effect is determined by anisotropy of the liquid crystal itself and a state of arrangement of liquid crystal molecules, controlling of the arrangement of liquid crystal molecules has much influence on stabilization of a display quality of the liquid crystal display panel.

Accordingly, the alignment film forming process for effectively aligning liquid crystal molecules is of much importance with respect to characteristics of picture quality in the liquid crystal cell process.

A method for inspecting the rubbing deficiency includes a first inspection process which determines whether the coated alignment film has a blur, a strip or a pin hole on its surface or not, and a second inspection process in which uniformity of the surface of the rubbed alignment film is checked and whether the surface of the rubbed alignment film has a scratch or not.

After the inspecting of the alignment film is finished, as shown in FIG. 7, spacers for uniformly maintaining a cell gap are formed on the lower substrate and a sealant is coated on an outer edge of the upper substrate. And then, the lower and upper substrates are attached by applying a pressure thereto (steps S106-S108). In this case, the spacers can be ball spacers according to a spreading method, or can be columnar spacers formed through patterning.

The lower and upper substrates are formed as large-scale glass substrates. In other words, a plurality of panel regions are formed on the large-scale glass substrates, and the TFT, the driving device, and the color filter layer are formed at each panel region. Thus, in order to obtain a unit liquid crystal display panel, the glass substrates are to be cut and processed (step S109).

In this case, in order to separate the mother substrates into individual liquid crystal panels, the method for cutting a liquid crystal display panel in accordance with the present invention is used, which will now be described in detail with reference to FIG. 9.

FIG. 9 is a flow chart illustrating the sequential processes of a method for cutting a liquid crystal display panel in accordance with the present invention in FIGS. 7 and 8.

First, the pair of attached mother substrates on which the plurality of panel regions have been formed are loaded and transferred to the first scribing unit through the transfer unit (step S201). In this case, the TFTs, driving elements, and the color filter substrates have been formed on the upper and lower panels.

After being transferred to the scribing unit, the first prearranged cut lines are formed to section the panel regions on the front and rear surfaces of the mother substrates through the first scribing unit.

After the first scribing process in the first direction is finished, the head provided at the scribing unit is driven in a Y axis direction to form second prearranged cut lines for sectioning the panel regions on the front and rear surfaces of the mother substrates.

In this manner, according to the method for cutting liquid crystal display panels, after the first prearranged cut lines are simultaneously formed on the front and rear surfaces of the mother substrates, the scribing head is driven in the Y axis direction to simultaneously form the second prearranged cut lines on the front and rear surfaces of the mother substrates. Thus, without having to rotate and reverse the mother substrates several times, the first and second prearranged cut lines can be formed on the front and rear surfaces of the mother substrates (step S202).

After the scribing process in the first and second directions is finished, the mother substrates are moved to the breaking part, and steam and dried air are sprayed onto the front and rear surfaces of the mother substrates through a steam break and an air knife. Then, a crack is formed along the prearranged cut lines and each panel region and the dummy glass of the mother substrates are separated and then transferred to the unloading part (step S203).

The trans hand if moved to an upper side of the mother substrates and positioned at an upper side of a certain panel region.

And then, the trans hand is moved down, and a surfaces of a liquid crystal display panel to be extracted is adsorbed and fixed through the adsorption members (step S204).

In this case, since the rectangular plate is attached at the edge of the trans hand, it can separate and fixes the dummy glass around the liquid crystal display panel from the liquid crystal display panel (step S205).

Thereafter, in a state that the plate and the dummy glass pressed and fixed by the plate are maintained at their positions, the body of the trans hand is moved up. Then, the liquid crystal display panel adsorbed to the adsorption members of the trans hand is completely separated from the dummy glass fixed by the plate and moved up (step S206) In this case, the cylinders connected with the plate is maintained to be driven downward until the dummy glass can be completely separated from the liquid crystal display panel.

After the liquid crystal display panel and the dummy glass are completely separated, the cylinders 164 are driven upward, so that the separated dummy glass is left in the uploading part and the liquid crystal display panel adsorbed onto the adsorption members 166 is transferred to the reversing unit.

Thereafter, as shown in FIG. 7, liquid crystal is injected through a liquid crystal injection opening in each unit liquid crystal display panel, the liquid crystal injection opening is sealed to form a liquid crystal layer, and then each unit liquid crystal display panel is inspected, thereby completing fabrication of each of the unit liquid crystal display panels (steps S110 and S111).

The liquid crystal is injected using a vacuum injection method using a pressure difference. That is, according to the vacuum injection method, the liquid crystal injection opening of the unit liquid crystal display panel separated from the large-scale mother substrates is put in a container filled with liquid crystal in a chamber with a certain degree of vacuum, and then, the degree of vacuum is changed to allow liquid crystal to be injected into the liquid crystal display panel according to a pressure difference between the interior and the exterior of the liquid crystal display panel. When the liquid crystal is filled inside the liquid crystal display panel, the liquid crystal injection opening is sealed to form the liquid crystal layer of the liquid crystal display panel. Thus, in order to form the liquid crystal layer at the liquid crystal display panel through the vacuum injection method, a portion of a seal pattern needs to be opened to serve as the liquid crystal injection opening.

However, the vacuum injection method has the following problem.

That is, first, it takes a long time to fill the liquid crystal in the liquid crystal display panel. In general, because the attached liquid crystal display panel has an area of hundreds of $cm^2$ and a gap of merely about a few μm, the amount of injected liquid crystal per unit hour is very small when the vacuum injection method using the pressure difference is employed. For example, about eight hours are required to fill a 15-inch panel with liquid crystal. Since that much time is required for fabrication of the liquid crystal display panel, the productivity is degraded. In addition, as the liquid crystal display panel is increased in size, time taken for filling liquid crystal would be more lengthened and a defective filling of liquid crystal would also occur, resulting in that it cannot cope with the enlargement of the liquid crystal display panel.

Second, a large amount of liquid crystal is used. In general, the amount of liquid crystal actually injected into the liquid crystal display panel is quite small compared with the amount of liquid crystal filled in the container, and when liquid crystal is exposed in the air or exposed to a specific gas, it is reacted to the gas and degraded. Thus, although the liquid crystal filled in the container is filled in the plurality of unit liquid crystal display panels, a large amount of liquid crystal remaining after finishing the filling is discarded, and accordingly, the unit cost of the liquid crystal panel is increased only to weaken price competitiveness of the product.

In order to solve the problem of the vacuum injection method, the dropping method is increasingly employed.

As shown in FIG. 8, when using the dropping method, after the alignment film is inspected (step S105), a seal pattern is formed with a sealant on the color filter substrate and, at the same time, a liquid crystal layer is formed on the array substrate (steps S106' and S107').

According to the dropping method, after liquid crystal is dropped and dispensed on the large-scale first mother substrate where a plurality of array substrates are disposed or on an image display region of the second mother substrate where the plurality of color filter substrates are disposed, the first and second mother substrates are attached by applying a certain pressure thereto to thereby make the liquid crystal uniformly distributed to the entire image display region and thus form a liquid crystal layer.

Thus, in the case where the liquid crystal layer is formed in the liquid crystal display panel through the dropping method, the seal pattern must be formed as a closed pattern surrounding the outer edge of the pixel part region in order to prevent a leakage of liquid crystal to outside of the image display region.

The dropping method allows dropping of liquid crystal within a relatively short time compared with the vacuum injection method and can quickly form the liquid crystal even when the liquid crystal display panel is large.

In addition, since only the required amount of liquid crystal is dropped on the substrate, an increase in the unit cost of the liquid crystal display panel due to the discarding of the high-priced liquid crystal as in the vacuum injection method can be prevented, and thus, the price competitiveness of the product can be enhanced.

Thereafter, when the upper and lower substrates on which liquid crystal has been dropped and the sealant has been coated are aligned, a pressure is applied thereto to make the lower and upper substrate attached by the sealant and simultaneously the dropped liquid crystal spread uniformly on the entire portion of the panel (step S108').

Through the process, the plurality of liquid crystal display panels with the liquid crystal layer formed thereon are formed on the large-scale glass substrates (upper and lower substrates). The glass substrates are processed and cut to be separated into the plurality of liquid crystal display panels, which are then inspected to thereby finish fabrication of the liquid crystal display panel (steps S109' and S110').

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for cutting a liquid crystal display panel comprising:
  forming cut lines on a pair of attached mother substrates on which a plurality of panel regions have been disposed; and
  separating the liquid crystal display panel from a dummy glass around the liquid crystal display panel through a transfer unit, said transfer unit including a body for adsorbing a liquid crystal display panel and transferring it and a plate attached on an edge of the body;
  fixing and separating a dummy glass of a mother substrate from the liquid crystal display panel; and
  moving up and down separately from the body of the transfer unit.

2. The method of claim 1, wherein the step of forming the cut lines on the pair of mother substrates comprises:
  transferring to a scribing part the pair of attached mother substrates on which the panel regions have been disposed; and
  forming first and second cut lines on the front and rear surfaces of the mother substrates with a scribing unit.

3. The method of claim 2, further comprising:
  transferring the mother substrates on which the first and second cut lines have been formed to a breaking part and separating them into a plurality of unit liquid crystal display panels.

4. The method of claim 3, wherein the mother substrates are conveyed to the scribing part and the breaking part through a conveying unit.

5. The method of claim 4, wherein the conveying unit comprises a plurality of conveyer belts.

6. The method of claim 4, wherein the conveying unit comprises a plurality of transfer rollers.

7. The method of claim 4, wherein the transfer unit comprises a first convey part formed as a conveyer belt and a second convey part formed as a transfer roller, which are coupled.

8. The method of claim 3, wherein the mother substrates are separated along the first and second cut lines by spraying steam through steam breaks disposed at front and rear surfaces of the mother substrates.

9. The method of claim 8, wherein moisture and glass chips remaining on the surfaces of the mother substrates are removed by spraying dried air through an air knife installed at rear surfaces of the steam breaks.

10. The method of claim 2, wherein the step of forming the first and second cut lines on the front and rear surfaces of the mother substrates comprises:
  forming the first cut lines for sectioning the panel regions on the front and rear substrates of the mother substrates in a first direction with a scribing unit; and
  forming the second cut lines for sectioning the panel regions on the front and rear substrates of the mother substrates in a second direction by driving a head provided at the scribing unit in a second direction.

11. The method of claim 2, wherein the first and second cut lines are substantially cross vertically.

12. The method of claim 1, wherein the step of separating the liquid crystal display panels from a dummy glass around the liquid crystal display panels comprises:
  moving a transfer unit having a plate is attached at an edge of a body to an upper side of a certain liquid crystal display panel;
  moving the transfer unit downward to adsorb a surface of the liquid crystal display panel to be extracted through adsorption members installed on the body; and
  driving the body upward in a state that the dummy glass around the liquid crystal display panel through the plate, to separate the liquid crystal display panel from the dummy glass.

13. The method of claim 1, further comprising:
  a plurality of cylinders connected with the plate and driven up and down separately from the body.

14. The method of claim 13, wherein the cylinders are driven down to press and fix the dummy glass around the liquid crystal display panel downward through the plate.

15. The method of claim 13, wherein when the body is moved up, the plate and the cylinders are maintained to be driven downward until the dummy glass is completely separated from the liquid crystal display panel.

16. The method of claim 1, wherein the body includes a plurality of adsorption members, adsorbs the surface of the liquid crystal display panel through the adsorption members, and transfers it to the following process.

17. The method of claim 1, wherein the plate has a frame form.

18. The method of claim 17, wherein the frame has a form corresponding to that of the liquid crystal display panels.

* * * * *